United States Patent [19]
Zeller

[11] 3,798,089
[45] Mar. 19, 1974

[54] FUEL FOR A MAGNETO-HYDRODYNAMIC GENERATOR

[75] Inventor: Rainer Zeller, Munich, Germany

[73] Assignee: Maschinenfabrik Augsburg Nurnberg Aktiengesellschaft, Munich, Germany

[22] Filed: Sept. 3, 1971

[21] Appl. No.: 177,876

[30] Foreign Application Priority Data
Sept. 4, 1970 Germany............................ 2043884

[52] U.S. Cl...................... 149/22, 149/87, 149/114
[51] Int. Cl............................................. C06b 15/00
[58] Field of Search....................... 149/22, 87, 114

[56] References Cited
UNITED STATES PATENTS

| | | | |
|---|---|---|---|
| 3,243,326 | 3/1966 | White et al. | 149/87 X |
| 3,567,531 | 3/1971 | Fuller et al. | 149/87 X |
| 3,652,349 | 3/1972 | Bartick | 149/87 X |
| 2,968,917 | 1/1961 | Whaley | 149/87 X |

*Primary Examiner*—Stephen J. Lechert, Jr.
*Attorney, Agent, or Firm*—Craig and Antonelli

[57] ABSTRACT

A fuel for a magneto-hydrodynamic generator in which readily ionizable seed material additives and power-increasing additives are suspended simultaneously in a liquid fuel carrier system whereby the suspension is stabilized in the form of a thixotropic gel by the addition of a suspension agent.

12 Claims, No Drawings

FUEL FOR A MAGNETO-HYDRODYNAMIC GENERATOR

The present invention relates to a fuel for a magneto-hydrodynamic generator consisting of a liquid carrier system to which are added seed materials and power-increasing additives.

For achieving as high as possible a power density, one seeks to operate combustion magneto-hydrodynamic generators, referred to frequently also as MHD generators, with operating media that possess a high electrical conductivity and simultaneously a high flow velocity. One approaches this goal in that one injects into the combustion space a readily ionizable, so-called seed material, and permits the combustion to take place at a high combustion chamber temperature.

The hitherto known magneto-hydrodynamic generators which operate with liquid fuels, are constructed according to the following principles. With the aid of pumps or pressure gas systems, a fuel, for example, kerosene, and an oxidizer, for example, liquid oxygen, are injected and combusted in the combustion space of a magneto-hydrodynamic generator. The seed material, for example, KOH dissolved in alcohol, is additionally fed to the combustion space by means of a separate injection system.

The following variations are known in the prior art:

1. A metal powder, for example, Al-powder is admixed to the fuel as power-increasing or temperature-increasing additive. The seed material is additionally and separately injected.
2. The seed material, for example, $K_2CO_3$ is admixed to the fuel and is injected into the combustion chamber together with the fuel. A power-increasing additive is dispensed with. 3. The seed material is not injected into the combustion chamber but instead into the feed line conducting the fuel.

The system mentioned above and the described modifications entail the following disadvantages:

1. With an additional seed material feed, a third injection system must be present. The installation is complicated thereby and a lowering of the temperature in the combustion chamber is connected therewith.
2. Spatial and periodic fluctuations of the electrical conductivity result from the separate seed material injection.
3. The Al-powder or seed material which has been admixed to the liquid fuel, deposits or settles in due course. Hence, the mixture has to be continuously agitated and circulated by a pump. Difficulties result with the feed of such fuel mixture due to separation processes. Any inhomogeneities of the mixture again become effective as and result in fluctuations of the electrical conductivity.

It is the primary object of the present invention to eliminate the aforementioned disadvantages by the fuel system to be described more fully hereinafter and by the simple injection process connected therewith.

The task of the present invention resides in preparing a magneto-hydrodynamic fuel which by reason of its composition produces during the combustion a high temperature and a high conductivity of the hot discharge gases, and to provide a fuel feed system by means of which the operation of a magneto-hydrodynamic generator can be considerably simplified by the use of the aforementioned fuel.

The fuel system essentially consists according to the present invention of a liquid carrier medium, for example, kerosene, benzene, toluene or other fuel carrier hydrocarbons normally used for that purpose. In this carrier medium power-increasing and readily ionizable additives are simultaneously suspended whereby the power-increasing agent can be added selectively. Known metallic seed additives, such as preferably fine-grained, metallic Al, B, Li, Mg or alloys thereof, may be used as power-increasing additives while known seed materials such as K, $K_2CO_3$, Cs or $Cs_2CO_3$ or other K and Cs compounds may be used as seed material for the fuel system in accordance with the present invention. By the admixture of a suspension agent, the suspension is stabilized in the form of a thixotropic gel. Conventional, commercially available suspension agents may be used, for example, Bentone-34, Thixogel, Aerosil and others are suitable as suspension agents for the fuel system of this invention.

Such a thixotropic fuel suspension possesses in the rest condition a stabilizing gel structure, i.e., a separation and deposit of the different additives will not occur also over longer periods of time. Under pressure load during the feed, i.e., during the movement of the medium, the liquid properties of the suspension increase enormously so that they can be injected into the combustion chamber also through smallest apertures---with a relatively small pressure drop.

The metal concentration may be selected at will between 0 and about 75 percent by weight while the ionizing additive as well as the proportion of the suspending agents are selected to be maximum about 10 percent by weight and about 8 percent by weight, respectively. The fine distribution, dispersing and the homogenization of the suspension are realized by means of a conventional high-power mixing apparatus. The finished magneto-hydrodynamic fuel is injected into the combustion space with the aid of a pressure gas feed system or a fuel pump and is combusted with an oxidizer. An additional injection of the seed material is dispensed with.

The following is a typical example of the procedure for the preparation of the fuel system in accordance with the present invention for a magneto-hydrodynamic generator. A liquid carrier medium is selected which may consist, for example, of kerosene, benzene, toluene or other liquid fuel carrier hydrocarbons normally used for that purpose. The amount of liquid carrier medium may vary widely, for example, between about 7 and 96 percent by weight. Readily ionizable seed additives and power-increasing additives are suspended simultaneously in the liquid carrier medium whereby the suspension is stabilized in the form of a thixotropic gel by the admixture of a suspension agent. Any suitable commercially available suspension agent may be used, such as Bentone-34, Thixogel, Aerosil and others in an amount of up to about 10 percent by weight of the suspension agent. The lower limit of the amount of suspension agent may be chosen at will depending on the desired gel formation and ingredients used, the only requirement being that the fuel will form a stabilized thixotropic gel. A minimum amount of about 2 percent by weight of the suspension agent has been found desirable. As power-increasing additive is used, preferably a fine-grained metal such as Al, B, Li, Mg or the alloys thereof whereby the metal concentration is between about 0 and about 75 percent by weight, preferably of the order of 20 to 40 percent by weight while the grain size is between about 2 to 100μ. Conventional seed materials may be used, such as K, $K_2CO_3$, Cs, $Cs_2CO_3$ as well as other K- and Cs- compounds known to be suitable for that purpose; the amount of seed additive may be up to about 8 percent by weight, preferably, however, no less than about 2 percent by weight. The fuel is prepared in a conventional manner in a high-power mixing apparatus of conventional type, producing the fine distribution, dispersion and homogenization of the various ingredients, and is subsequently stored in fuel tanks as usual. The fuel is subsequently injected into the combustion chamber with the aid of a conventional pressure gas feed system or turbo-pump by way of a single injection system of conventional type, whereby the combustion takes place in the combustion chamber with the aid of the oxidizer conventionally fed to the combustion chamber by means of a second injection system. Thus, the fuel system in accordance with the present invention, stored in conventional fuel tanks, can be fed to the combustion chamber of a magneto-hydrodynamic generator by way of a single injection system and is combusted together with the oxidizer feed to the combustion chamber by way of a second injection system, thereby economizing the need for the third injection system as was required with certain prior art systems.

The following are a few typical examples for the preparation of a fuel in accordance with the present invention.

EXAMPLE 1

Initially a thickly liquid base mass with about 40 l (about 26 percent by weight) of kerosene and about 9 kg (about 6 percent by weight) of a suspension agent, for example, Bentone-34 is mixed by stirring during a period of about 20 minutes. Subsequently thereto, the remaining quantity of kerosene of about 60 l (about 40 percent by weight) is admixed under continued stirring for about 30 minutes so that a gel of high stability is obtained. To the thus obtained thin liquid mass is now admixed during continued stirring the seed material in an amount of about 3 kg (about 2 percent by weight) of, for example, $K_2CO_3$ (for about 20 minutes) as well as 40 kg (about 26 percent by weight) of Al powder having a grain size between about 2 – 100μ (for about 20 minutes) so that finally a homogeneous suspension results which is injected with the aid of a pressure gas feed system into a combustion space and is combusted with oxygen, fed by way of a second injection system.

EXAMPLE 2

30 l (33.5 percent by weight) of kerosene or benzene are mixed by stirring with 8 kg (8.9 percent by weight) of a suspension agent, for example, Bentone-34 into a thickly liquid base mass. After the further-step wise addition of the remaining kerosene in an amount of 50 l (55.7 percent by weight) whereby a homogenized, thinly liquid mass results, an amount of 1.7 kg of $K_2CO_3$ (1.9 percent by weight) is admixed under continued stirring. A power increasing metallic additive is dispensed with in this case.

Bentone-34 made by the Titan-Gesellschaft, Leverkusen, Germany, consists of an inorganic portion (about 60 percent by weight) and of an organic portion (about 40 percent by weight of $C_{38}H_{70}N$). The inorganic portion is composed of about 35 percent by weight of $SiO_2$, about 20 percent by weight of $Al_2O_3$, about 3 percent of $Fe_2O_3$ and the rest of Mg-, Na- and K-oxides.

The foregoing examples are merely illustrative of the present invention. However, it is understood that the present invention is not limited thereto but is susceptible of numerous changes and modifications as known to those skilled in the art and I, therefore, do not wish to be limited to the details shown and described herein but intend to cover all such changes and modifications as are encompassed by the scope of the appended claims.

What I claim is:

1. A thixotropic fuel for a magneto-hydrodynamic generator, which comprises at least some up to 8 percent by weight of at least one readily ionizable seed material additive selected from the group consisting of K, $K_2CO_3$, Cs, $Cs_2CO_3$, and other seed material compounds of K and Cs, and at least some up to 75 percent by weight of at least one powdered power-increasing metallic additive, said additives being individually suspended in a liquid fuel and said thixotropic fuel also containing at least some up to 10 percent by weight of a suspension agent to stabilize said resulting suspension of additive in the liquid fuel as a thixotropic gel.

2. A fuel according to claim 1, characterized in that the liquid fuel carrier system essentially consists of hydrocarbons.

3. A fuel according to claim 2, characterized in that the power-increasing additives essentially consist of a fine-grained metal with a metal concentration between 0 and about 75 percent by weight and the grain size between about 2 and about 100μ.

4. A fuel according to claim 3, characterized in that metallic Al, B, Li, Mg or the alloys thereof are used as power-increasing additives.

5. A fuel according to claim 4, characterized in that the metal concentration is about 20 to 40 percent by weight.

6. A fuel according to claim 1, characterized in that the fuel contains about 2 percent by weight of seed material.

7. A fuel according to claim 1, characterized in that the fuel is finally divided, dispersed and homogenized.

8. A fuel supply according to claim 1, characterized in that the following amounts of components are contained in the fuel:

$$2 \leq \text{suspension agent} \leq 10$$

$$0 < \text{power-increasing additive} < 75$$

$$2 \leq \text{seed material} \leq 8.$$

9. A fuel according to claim 1, characterized in that the power-increasing additives essentially consist of a fine-grained metal with a metal concentration between 0 and about 75 percent by weight and the grain size between about 2 and about 100μ.

10. A fuel according to claimm 9, characterized in that the metal concentration is about 40 percent by weight.

11. A fuel according to claim 10, characterized in that metallic Al, B, Li, Mg or the alloys thereof are used as power-increasing additives.

12. A fuel according to claim 1, characterized in that the fuel contains about 2 percent by weight of seed material.

* * * * *